United States Patent
Jamison et al.

(10) Patent No.: US 7,342,675 B2
(45) Date of Patent: Mar. 11, 2008

(54) SYSTEMS AND METHODS FOR IMPROVED OPERATION AND TROUBLESHOOTING OF A PRINTING DEVICE

(75) Inventors: Ryan Jamison, Boise, ID (US); Eugene Castro, Meridian, ID (US); John Moffatt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 10/281,672

(22) Filed: Oct. 28, 2002

(65) Prior Publication Data

US 2004/0080773 A1    Apr. 29, 2004

(51) Int. Cl.
- G06F 15/17  (2006.01)
- G06F 12/16  (2006.01)
- G06F 11/07  (2006.01)
- G06F 11/34  (2006.01)
- G06F 3/12   (2006.01)
- G06K 15/02  (2006.01)

(52) U.S. Cl. .................. 358/1.14; 358/1.13; 358/1.15; 358/1.16; 358/437; 358/444

(58) Field of Classification Search .................. None
See application file for complete search history.

(56) References Cited

U.S. PATENT DOCUMENTS

| | | | | |
|---|---|---|---|---|
| 3,562,555 A | * | 2/1971 | Ahrons | 365/229 |
| 4,742,482 A | * | 5/1988 | Inskeep et al. | 714/14 |
| 4,951,309 A | * | 8/1990 | Gross et al. | 379/102.04 |
| 5,027,154 A | | 6/1991 | Ujiie et al. | |
| 5,533,193 A | | 7/1996 | Roscoe | |
| 5,588,054 A | * | 12/1996 | Shin et al. | 379/413 |
| 5,799,206 A | * | 8/1998 | Kitagawa et al. | 710/36 |
| 5,834,857 A | * | 11/1998 | Abe et al. | 307/66 |
| 5,875,037 A | * | 2/1999 | Murata et al. | 358/400 |
| 6,188,488 B1 | * | 2/2001 | Kato | 358/1.16 |
| 6,304,336 B1 | * | 10/2001 | Sugaya | 358/1.16 |
| 6,333,790 B1 | * | 12/2001 | Kageyama | 358/1.15 |
| 6,507,409 B2 | * | 1/2003 | Kawaguchi | 358/1.16 |
| 6,812,911 B2 | * | 11/2004 | Makishima et al. | 345/92 |
| 2002/0073434 A1 | * | 6/2002 | Pience | 725/119 |
| 2003/0077097 A1 | | 4/2003 | Parry | |
| 2004/0080775 A1 | * | 4/2004 | Owen et al. | 358/1.14 |

FOREIGN PATENT DOCUMENTS

| | | | | |
|---|---|---|---|---|
| JP | 04227526 A | * | 8/1992 | |
| JP | 04265766 A | * | 9/1992 | |

* cited by examiner

*Primary Examiner*—Twyler Lamb
*Assistant Examiner*—Myles D. Robinson

(57) ABSTRACT

Systems and methods are described herein for improved operation and troubleshooting of a printing device. A printing device includes a master module wherein printing device operation data can be stored in non-volatile memory. The master module is provided with non-volatile memory or an uninterruptible power source so that the master module memory may be retained and dumped upon request. The memory dump may transmit the memory contents to a local external device through a port, such as an infrared port or a USB (Universal Serial Bus) port, or the memory contents may be transmitted to a remote location. The dumped data may then be analyzed to quickly identify a problem component in the printing device.

17 Claims, 2 Drawing Sheets

SYSTEMS AND METHODS FOR IMPROVED OPERATION AND TROUBLESHOOTING OF A PRINTING DEVICE

TECHNICAL FIELD

This invention generally relates to printing devices. More particularly, the invention relates to improved systems and methods for operation and troubleshooting printing devices.

BACKGROUND

When a printing device fails to function due to a faulty component within the printing device, troubleshooting the source of the problem or simply attempting to identify the faulty component can be problematic. One reason for this is that memory utilized in printing devices fails to retain critical information regarding printing devices errors or printing device usage when the printing device fails. As a result, a technician does not have access to such information that, if available, would allow the technician to easily identify—at least within a reasonable degree of certainty—one or more components that have caused the printing device failure.

When a faulty component cannot be clearly and positively identified, it is often the case that one or more working components are replaced in an attempt to remedy the problem. For example, a first component may be replaced simply to get power to the printing device so that a second component may be identified as having a problem. For a printing device manufacturer or repair service, such unnecessary replacement of components in working condition can waste several thousand dollars a year—not only in parts replacement, but in testing components that are replaced and returned to the manufacturer for testing, and re-marketing the working, but used, components.

SUMMARY

Systems and methods are described herein for improved operation and troubleshooting of printing devices. The systems and methods provide ways in which important information is retained when a printing device fails. The information can be transmitted, locally or remotely, to a technician who can use the information to quickly and accurately pinpoint a component that caused the printing device failure.

A printing device includes a master module that has its own memory, separate and apart from printing device memory utilized for print processing. The master module also includes a non-interruptible power source, such as a backup battery, that provides continuous power to the master module memory. Contents of the master module memory are thus retained even when power to the printing device is lost. In another implementation, non-volatile memory is utilized in the memory module, thus eliminating the need for a battery backup.

The master module memory stores printing device information that can be utilized to improve printing device operation or to identify a source of the problem experienced by the printing device. In one implementation, the master module memory stores error messages generated by the printing device, the error messages providing troubleshooting guidance about the printing device failure.

In another implementation, the master module memory stores printing device usage information, such as number of pages printed, average print density, ink/toner usage, etc. Such usage information may be used to determine which component is likely to be ready for replacement.

Storing some data in master module memory also frees up printing device memory that can be used for print processing. Having additional memory available for processing can decrease the cost of a printing device and/or allow the printing device to operate more efficiently.

The master module also provides a user interface and the capability to dump the contents of the master module memory for analysis. The master module memory dump may transmit the contents of the master module memory locally through a communications port such as a USB (Universal Serial Bus) port, an infrared (IR) port, parallel port, or the like. Additionally, the master module memory may be transmitted remotely so that a printing device problem may be analyzed by a remote technician.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The following description sets forth one or more specific implementations and/or embodiments of systems and methods for improved operation and troubleshooting of printing devices. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods for improved operation and troubleshooting of printing devices. Applicant intends these exemplary implementations to be examples only. Applicant does not intend these exemplary implementations to limit the scope of the appended claims. Rather, Applicant has contemplated that the claimed embodiments might also be implemented in other ways, in conjunction with other technologies.

Computer-Executable Instructions

An implementation of a system and/or method for improved operation and troubleshooting of printing devices is presented and may be described in the general context of computer-executable instructions, such as program modules, executed by one or more printing devices, computers or other devices. Generally, program modules include routines, programs, objects, components, data structures, etc., that perform particular tasks or implement particular abstract data types. Typically, the functionality of the program modules may be combined or distributed as desired in various embodiments.

Computer-Readable Media

An implementation of a system and/or method for improved operation and troubleshooting of printing devices may be stored on or transmitted across some form of computer-readable media. Computer-readable media can be any available media that can be accessed by a computer and/or processor. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer and/or processor.

"Communications media" typically embodies computer-readable instructions, data structures, program modules, or other data in a modulated data signal, such as carrier wave or other transport mechanism. Communication media also includes any information delivery media.

Exemplary Printing Device

Figure 1:
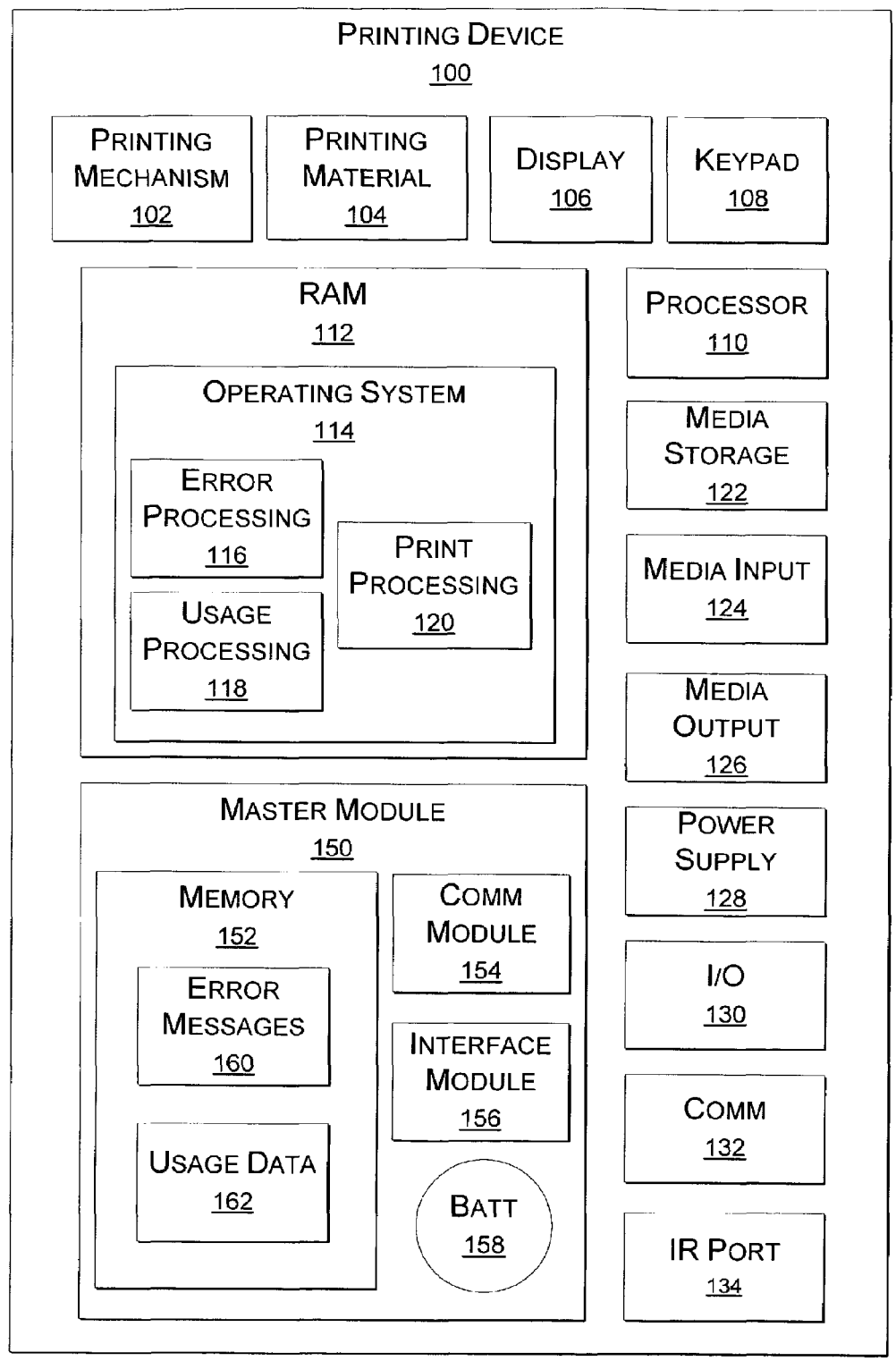
FIG. 1 is a block diagram of an exemplary printing device utilizing a master module in accordance with the description provided herein.

FIG. 1 is a block diagram of an exemplary printing device 100 constructed in accordance with the present description. The printing device 100 may be a laser printer, inkjet printer, dot matrix printer, photocopier, facsimile machine, or the like. For purposes of the present discussion, the printing device 100 will be described generically. A printing device constructed in accordance with the printing device 100 shown in FIG. 1 may include functional equivalents of the components shown and described in FIG. 1, or may include more or less components than those shown in FIG. 1.

The printing device 100 includes a printing mechanism 102 and printing material 104 that will differ depending on the embodiment of the printing device 100. For example, if the printing device 100 is a laser printer, then the printing mechanism 102 will be a drum/fuser and the printing material 104 will be toner. If the printing device 100 is an inkjet printer, then the printing mechanism 102 will be a print head and the printing material 104 will be ink.

The printing device 100 also includes a display 106 and a keypad 108.

The keypad 108 may also be integrated with the display 106, such as in a key diagram on a touch-sensitive display. The display 106 and keypad 108 are a user interface that allows the printing device 100 to provide messages to a user via the display 106, and allows the user to enter instructions/data to the printing device via the keypad 108.

A processor 110 and random access memory (RAM) 112 are included in the printing device 100 to enable the printing device 100 to execute computer-executable instructions stored in the RAM 112 on the processor 110. An operating system 114 stored in the RAM 112 includes computer-executable instructions that control operation of the printing device 100. The operating system 114 includes an error processing module 116, a usage processing module 118 and a print processing module 120.

The print processing module 120 includes computer-executable instructions that are executable on the processor 110 to perform printing functions necessary for the printing device 100 to operate properly. The error processing module 116 includes computer-executable instructions that are executable on the processor 110 to detect errors in the printing device 100 and in print processing and to assign predefined error messages to particular errors encountered.

The usage processing module 118 includes computer-executable instructions that are executable on the processor 110 to monitor printing device 100 usage parameters including, but not limited to, number of pages printed, printing material 104 usage, print mechanism 102 life, and the like.

The printing device 100 also includes media storage 122 (such as one or more paper trays), media input 124, media output 126 and a power supply 128 that provides electrical power to the printing device 100. One or more input/output (I/O) ports 130 that may include one or more of the following: a universal serial bus (USB) port, a parallel port, and/or a serial port. A communications module or port 132—such as a network interface card, a modem, etc.—is included in the printing device 100 so that the printing device 100 may communicate with one or more local or remote host computers (not shown). The printing device 100 also includes an infrared (IR) port 134 tat enables the printing device 100 to transmit data to and/or receive data from another IR device (not shown).

A master module 150 included in the printing device 100 includes master module memory 152, a communications module 154, an interface module 156 and a battery 158. The master module memory 152 is non-volatile memory that draws power from the power supply 128 if available. If the power supply 128 fails to provide power to the master module memory 152, then the master module memory 152 draws backup power from the battery 158. It is noted that, although the present implementation depicts non-volatile memory as being provided by memory with an uninterruptible power source, the non-volatile memory (i.e., the master module memory 152) may be any type of memory that does not lose data when power is removed from it. Other implementations of non-volatile memory may utilize core memory, ROM (read only memory), EPROM (electronically programmable read only memory), flash memory, bubble memory, and the like.

The master module memory 152 stores error messages 160 generated by the error processing module 116, and usage data 162 generated by the usage processing module 118. The communications module 154 is configured to dump the contents of the master module memory 152 (i.e., the error messages 160 and the usage data 162) to an external device (not shown) via the I/O port 130, the communications port 132 and/or the IR port 134. The communications module 154 dumps the error messages 160 and the usage data 162 in response to commands entered via the interface module 156. In an alternative implementation, the error messages 160 and the usage data 162 are automatically dumped in the event of an interruption in power from the power supply 128.

It is noted that, although the interface module 156 is shown as being separate from the display 106 and the keypad 108, the printing device 100 could be implemented to integrate the interface module 156 into the keypad 108 and display 106. In such an implementation, the keypad 108 and the display 106 would also have to receive backup power from the battery 158.

The error messages 160 and usage data 162 are stored as they are generated by the error processing module 116 and the usage processing module 118, respectfully. When all available master module memory 152 has been utilized, then the oldest data is deleted as new data comes in so that there is always room for the latest data generated by the operating system 114.

As a result of the master module memory 152 having a non-interruptible power source (i.e., battery 158) or of being some type of non-volatile memory, the most recent error messages 160 and usage data 162 is always available to troubleshoot a problem with the printing device 100. When a problem occurs—even if the problem involves the loss of power to the printing device 100—the master module memory 152 may be downloaded to a local or remote device (not shown) and analyzed by a technician to quickly and accurately locate the source of the problem.

Methodological Implementation: Troubleshooting a Printing Device

Figure 2:
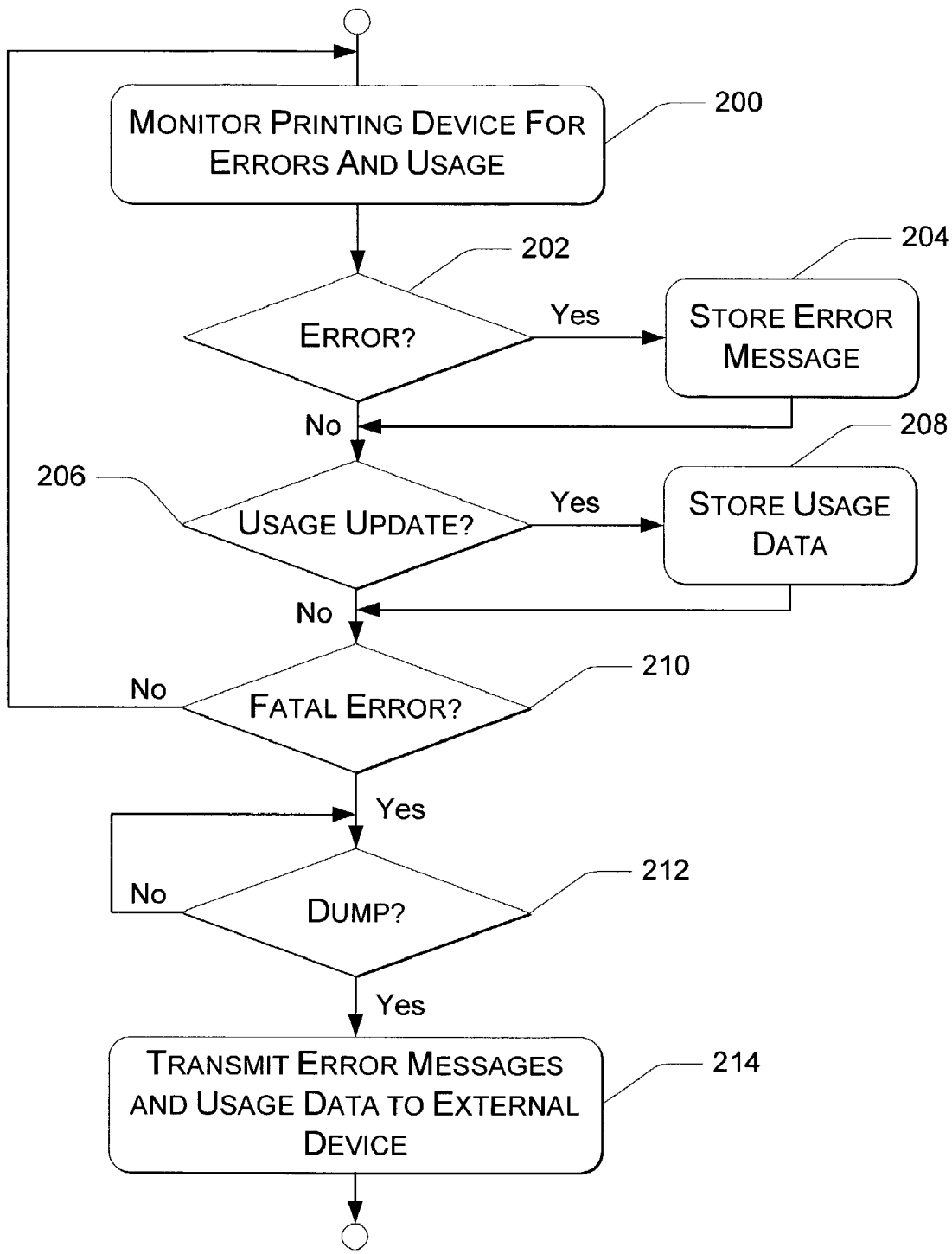
FIG. 2 is a flow diagram depicting an implementation of a method for improved operation and troubleshooting of the document processing system shown in FIG. 1.

FIG. 2 is a flow diagram depicting a methodological implementation of troubleshooting a problem with a printing device similar to the exemplary printing device 100 shown in FIG. 1. In the discussion of FIG. 2, continuing reference will be made to the elements and reference numerals of FIG. 1.

At block 200, the operating system 114 monitors the printing device 100 for errors and for usage. More specifically, the error processing module 116 monitors the printing device 100 for errors and the usage processing module 118 monitors the printing device 100 for usage characteristics.

If the error processing module 116 detects an error (i.e., a non-fatal error) in the printing device 100 ("Yes" branch, block 202), then the error processing module 116 assigns an error message to the particular error encountered and stores the error message in the master module memory 152 at block 204. As long as no error is detected by the error processing module 116 ("No" branch, block 202), the processing continues at block 206.

At certain predefined intervals or upon the occurrence of one or more particular events, the usage processing module 118 collects usage data from one or more components in the printing device 100 and stores the usage data in the master module memory 152. At block 206, if the usage processing module 118 determines that it is time to update the usage data ("Yes" branch, block 206), then the usage processing module 118 stores current usage data collected in the master module memory 152 at block 208. As long as the usage processing module 118 does not detect an event that indicates that usage data should be updated ("No" branch, block 206), the process continues at block 210.

If a fatal error occurs in the printing device 100 ("Yes" branch, block 210), then the master module 150 awaits an instruction from a user to dump the contents of the master module memory 152 at block 212. A fatal error is an error that causes the printing device 100 to shut down or fail to operate. A fatal error may or may not involve a loss of power from the main power supply 128.

As long as no fatal error is detected ("No" branch, block 210), the monitoring process continues at block 200. The previously described steps are performed continuously while the printing device 100 is in operation.

When a user enters an instruction to dump the master module memory 152 contents ("Yes" branch, block 212), then the error messages 160 and the usage data 162 is transmitted to an external device (not shown) at block 214. As long as no such instruction is received ("No" branch, block 212), the printing device 100 remains in its non-operable state.

The dump instruction from the user may include a port through which the data should be transmitted, or may name a device or a location to which the information should be sent. For example, the dump instruction may include directions to transmit the master module memory 152 contents through the USB port (I/O port 130) or the IR port 134. Alternatively, the dump instruction may include directions to transmit the master module memory 152 to a particular web site via the communications port 132. The web site may be predefined to refer to a web site operated by a manufacturer of the printing device 100.

A technician at the location to which the master module memory 152 contents is sent can analyze the data to quickly and accurately determine the cause of the fatal error. A correct replacement component can then be installed in the printing device 100 to render the printing device 100 operational.

CONCLUSION

Implementation of the improved troubleshooting systems and methods described herein provide a way for printing device problems to be quickly identified and corrected even in the event that the printing device loses power. Storing certain critical troubleshooting data in the master module memory also frees up printer RAM for other printer functions.

Although the systems and methods have been described in language specific to structural features and/or methodological steps, it is to be understood that the systems and methods defined in the appended claims is not necessarily limited to the specific features or steps described. Rather, the specific features and steps are disclosed as preferred forms of implementing the claimed systems and methods.

The invention claimed is:

1. A printing device, comprising:
   a printing device power supply that provides an electrical current to the printing device;
   a master module to facilitate troubleshooting of the printing device when the electrical current from the printing device power supply to the printing device is interrupted; the master module including master module memory, a communications program module, and a master module power source;
   printing device memory that includes a print processing program module and an error processing program module; the print processing program module to perform printing functions of the printing device, and the error processing program module to store at least one error message in the master module memory; and
   a port to transmit memory contents;
   wherein the master module power source is to supply electricity to the master module to persist the at least one error message in the master module memory if the electrical current from the printing device power supply to the printing device is interrupted; and
   wherein the communications program module is to dump the at least one error message from the master module memory via the port while the electrical current from the printing device power supply to the printing device is interrupted by using the master module power source.

2. The printing device as recited in claim 1, wherein the at least one error message is generated by the error processing program module to identify an operational problem with the printing device.

3. The printing device as recited in claim 1, wherein:
   the printing device memory further includes a usage processing program module, the usage processing program module to store at least one usage parameter in the master module memory;
   the master module power source is to supply electricity to the master module to persist the at least one usage parameter in the master module memory if the electrical current from the printing device power supply to the printing device is interrupted; and wherein the communications program module is to dump the at least one usage parameter from the master module memory via the port while the electrical current from the printing device power supply to the printing device is interrupted by using the master module power source.

4. The printing device as recited in claim 3, wherein the at least one usage parameter relates to at least one of a number of pages printed, a printing material usage, or a print mechanism life.

5. The printing device as recited in claim 1, wherein the communications program module is to dump the at least one error message from the master module memory via the port automatically without a command being entered when the electrical current from the printing device power supply to the printing device is interrupted.

6. The printing device as recited in claim 1, wherein:
the master module further includes an interface module having an interface program module, the interface program module to receive a command to dump the memory contents; and
the communications program module is to dump the at least one error message from the master module memory via the port in response to the interface program module receiving the command to dump the memory contents.

7. The printing device as recited in claim 6, further comprising:
a user interface including a display and a keypad; the display to provide messages to a user, and the keypad to allow the user to enter at least one of instructions or data to the printing device.

8. The printing device as recited in claim 7, wherein the interface module of the master module comprises the user interface of the printing device; and wherein the master module power source is to supply electricity to the user interface of the printing device if the electrical current from the printing device power supply to the printing device is interrupted.

9. The printing device as recited in claim 1, wherein the master module power source comprises a non-interruptible power source.

10. The printing device as recited in claim 9, wherein the non-interruptible power source comprises a battery.

11. The printing device as recited in claim 1, wherein the master module memory comprises non-volatile memory.

12. The printing device as recited in claim 2, wherein the port comprises at least one of an input/output (I/O) port, a communications port, or an infrared (IR) port.

13. The printing device as recited in claim 1, wherein the port comprises at least one of a modem, network interface card, or a Universal Serial Bus (USE).

14. The printing device as recited in claim 1, wherein the communications program module is to dump the at least one error message from the master module memory via the port to transmit the at least one error message to a local device.

15. The printing device as recited in claim 1, wherein the communications program module is to dump the at least one error message from the master module memory via the port to transmit the at least one error message to a remote device.

16. The printing device as recited in claim 1, wherein the printing device comprises at least one of a laser printer, an inkjet printer, a copier, a plotter, a printer, or a facsimile machine.

17. A printing device, comprising:
a printing device power supply that provides an electrical currrent to the printing device;
a master module to facilitate troubleshooting of the printing device when the electrical current from the printing device power supply to the printing device is interrupted; the master module including master module memory, a communications program module, and a master module power source;
printing device memory that includes a print processing program module and a usage processing program module; the print processing program module to perform printing functions of the printing device, and the usage processing program module to store at least one usage parameter in the master module memory; and
a port to transmit memory contents;
wherein the master module power source is to supply electricity to the master module to persist the at least one usage parameter in the master module memory if the electrical current from the printing device power supply to the printing device is interrupted; and
wherein the communications program module is to dump the at least one usage parameter from the master module memory via the port while the electrical current from the printing device power supply to the printing device is interrupted by using the master module power source.

* * * * *

UNITED STATES PATENT AND TRADEMARK OFFICE
CERTIFICATE OF CORRECTION

| | | |
|---|---|---|
| PATENT NO. | : 7,342,675 B2 | Page 1 of 1 |
| APPLICATION NO. | : 10/281672 | |
| DATED | : March 11, 2008 | |
| INVENTOR(S) | : Ryan Jamison et al. | |

It is certified that error appears in the above-identified patent and that said Letters Patent is hereby corrected as shown below:

In column 4, line 17, delete "tat" and insert -- that --, therefor.

In column 7, line 47, in Claim 12, delete "claim 2" and insert -- claim 1 --, therefor.

In column 8, line 3, in Claim 13, delete "(USE)" and insert -- (USB) --, therefor.

In column 8, line 21, in Claim 17, delete "currrent" and insert -- current --, therefor.

Signed and Sealed this

Twelfth Day of August, 2008

JON W. DUDAS
*Director of the United States Patent and Trademark Office*